(No Model.)

J. A. FOSTER.
SKINNING KNIFE.

No. 525,737.      Patented Sept. 11, 1894.

WITNESSES:
C. L. Bendixon
J. J. Laass

INVENTOR:
James A. Foster
By E. Laass
his ATTORNEY

UNITED STATES PATENT OFFICE.

JAMES A. FOSTER, OF FULTON, NEW YORK.

SKINNING-KNIFE.

SPECIFICATION forming part of Letters Patent No. 525,737, dated September 11, 1894.

Application filed March 29, 1894. Serial No. 505,524. (No model.)

*To all whom it may concern:*

Be it known that I, JAMES A. FOSTER, of Fulton, in the county of Oswego, in the State of New York, have invented new and useful Improvements in Skinning-Knives, of which the following, taken in connection with the accompanying drawings, is a full, clear, and exact description.

This invention relates to the class of skinning-knives which have the knife-blade sustained between guard-plates removably and adjustably to protrude with the edge of the knife-blade a greater or less degree from the edges of the guard-plates. And the invention consists in an improved construction and combination of the component parts of the skinning-knife as hereinafter fully described and specifically set forth in the claims.

Figure 1:
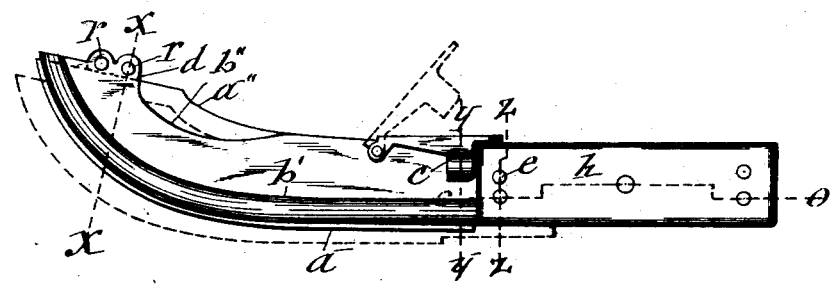
Figure 2:
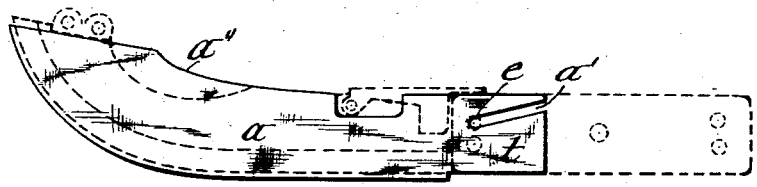
Figure 3:
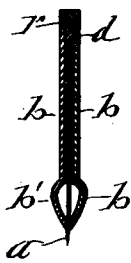
Figure 4:
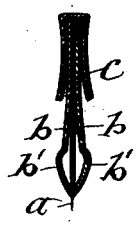
Figure 5:
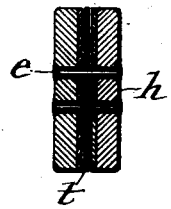
Figure 6:
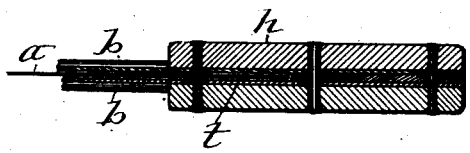

In the annexed drawings Figure 1 is a side view of a skinning-knife embodying my improvements. Fig. 2 is a side view of the knife-blade with the companion members of the implement indicated by dotted lines. Figs. 3, 4 and 5 are enlarged transverse sections respectively on lines —X—X—, —Y—Y— and —Z—Z— in Fig. 1, and Fig. 6 is a longitudinal section on line —O—O— in Fig. 1.

Similar letters of reference indicate corresponding parts.

—h— represents the handle of the skinning-knife.

—a— denotes the knife-blade which is movably connected to said handle and —b—b— the guard-plates which are fastened to the handle and sustain the blade —a— between them. In order to render said guard-plates more efficient and reliable in the operation of the skinning-knife, I form said guard-plates with longitudinal external ribs —b'—b'— along the edges adjacent to the cutting edge of the blade —a— which ribs serve to brace the edge of the knife and also to push the hide or skin more effectually from the cutting edge of the knife so as to prevent cutting said hide or skin. The blade —a— is sustained adjustably to protrude the proper distance from the edges of the guard-plates to allow the operator to remove the hide or skin from the carcass with the greatest rapidity and facility without danger of cutting the hide or skin. Said blade can also be adjusted to protrude sufficiently from the guard-plates to allow said blade to be ground or sharpened while supported in the guard-plates as indicated by dotted lines in Fig. 1 of the drawings. For this purpose I form the blade —a— with a tang —t— which slides in a longitudinal slot in the handle —h— and is provided with an oblique slot —a'— as shown in Fig. 2 of the drawings. Transversely through the handle —h— and through the slot —a— passes a pin —e— which is secured to the handle. The front end portions of the guard-plates are tied together by rivets —r—r— passing transversely through the plate near the back edges thereof and through a bushing —d— interposed between the plates as shown in Fig. 3 of the drawings. Said bushing serves to keep the plates —b—b— the requisite distance apart and at the same time forms a stop against which the back of the knife rests during the operation of the implement.

To retain the knife-blade —a— in its adjusted position between the guard-plates, I employ the spring metal clamp —c— pivoted to the said plates near the back edges thereof adjacent to the handle —h— and formed with jaws by which it yieldingly embraces the guard-plates and presses the same against opposite sides of the knife-blade as more clearly shown in Fig. 4 of the drawings. Said yielding clamp allows the blade —a— to be adjusted without removing the clamp.

To facilitate the adjustment of the blade —a—, I form the back edges of the guard-plates —b—b— with recesses —b''—b''— near the free ends of said plates or immediately back of the combined tie and stop —d— and form the corresponding portion of the blade —a— with an inclined back-portion —a''— which normally projects from the backs of the guard-plates as represented by full lines in Fig. 1 of the drawings.

By striking the inclined back portion —a''— of the blade —a— with a hard tool or against a hard object, the blade —a— is caused to move longitudinally and outward from the edges of the guard-plates —b—b— as indicated by dotted lines in Fig. 1 of the drawings. The tang end of the blade —a— being compelled to follow said movement by the engagement of the pin —e— with the slot —a'— and thus the knife-blade can be readily adjusted to protrude from the guard-plates the proper distance required in the operation of skinning or sharpening the blade. It is retained in its adjusted position by pressing the clamp onto the guard-plates as shown by full lines in Fig. 1 of the drawings.

What I claim as my invention is—

1. In combination with the handle —h— and blade —a—, the guard-plates —b—b— attached to the handle and provided with the longitudinal ribs —b'—b'— immediately adjacent to the edge of the blade, to brace the same and guard more effectually against cutting the skin or hide as set forth.

2. In combination with the handle —h— and guard-plates —b—b— attached thereto, the knife-blade —a— provided with the oblique slot —a'—, the pin —e— passing through the handle and aforesaid slot, the stop and tie —d— uniting the free ends of the guard-plates, and the clamp —c— pivoted to the latter plates and straddling the same adjacent to the handle, as set forth.

3. The combination with the handle —h—, of the knife-blade —a— formed with the inclined back portion —a''— and with the oblique slot —a—, the pin —e— passing through the handle and said slot, the guard-plates —b—b— formed with the recesses —b''— in their backs, the stop and tie —d— attached to the free ends of the guard-plates, and the clamp —c— pivoted to the guard-plates adjacent to the handle and yieldingly embracing said plates to permit the blade to be driven outward from the guard-plates by pressure applied to the back portion —a''— of the blade as set forth.

In testimony whereof I have hereunto signed my name this 20th day of March, 1894.

JAMES A. FOSTER. [L. S.]

Witnesses:
  GEORGE F. TRAGESER,
  C. F. FOSTER.